United States Patent [19]
Kurita et al.

[11] 3,723,222
[45] Mar. 27, 1973

[54] PROCESS FOR MANUFACTURING CORRUGATED THERMOPLASTIC SYNTHETIC RESIN CARDBOARD SHEET

[75] Inventors: Kiyoshi Kurita, Tokyo; Hiroshi Shigematsu, Ichihara; Tomoyuki Koyama, Yokohama; Souichiro Endo, Tokyo; Kensaku Yamawaki, Ichihara, all of Japan

[73] Assignee: Mitsui Petrochemical Industries, Ltd., Tokyo, Japan

[22] Filed: May 1, 1970

[21] Appl. No.: 33,563

[52] U.S. Cl. ........... 156/309, 156/205, 156/210, 156/332
[51] Int. Cl. .................................................. C09j 7/04
[58] Field of Search ............. 156/205, 210, 309, 332

[56] References Cited

UNITED STATES PATENTS

| | | |
|---|---|---|
| 2,719,566 | 10/1955 | Blatt ........................... 156/205 |
| 3,307,994 | 2/1967 | Scott, Jr. ....................... 156/210 |
| 3,404,748 | 10/1968 | Bjorksten ..................... 156/210 X |
| 3,518,142 | 6/1970 | Dooley .......................... 156/332 |
| 3,519,531 | 7/1970 | James ........................... 156/332 |
| 3,617,419 | 11/1971 | Fischer .......................... 156/332 |

*Primary Examiner*—Reuben Epstein
*Attorney*—Sherman and Shalloway

[57] ABSTRACT

A continuous process for manufacturing with good reproducibility a corrugated thermoplastic synthetic resin cardboard sheet free of defects diminishing the commercial value of the produce such as "warp" and "crookedness". This process is characterized in that thin layers of a thermoplastic synthetic resin having a melting point at least 10°C. lower than that of any of thermoplastic synthetic resins constituting the core sheet and surface liner sheets are formed on faces selected from the group consisting of (i) front and back faces of the continuous thermoplastic synthetic resin sheet to be shaped into a core sheet, (ii) faces to be bonded to the core sheet, of each of said surface liners, and (iii) all the faces mentioned in (i) and (ii), before the shaping of the core sheet and before the melt-press bonding of the surface liners onto the continuous core sheet.

6 Claims, 7 Drawing Figures

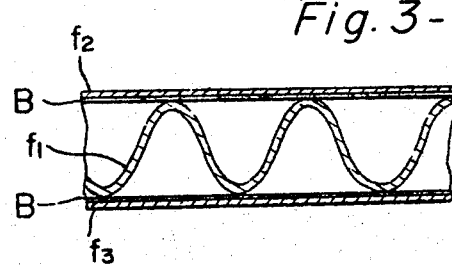
Fig. 3-a
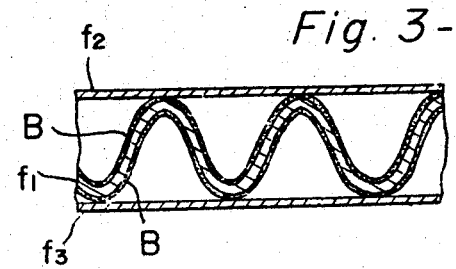
Fig. 3-b
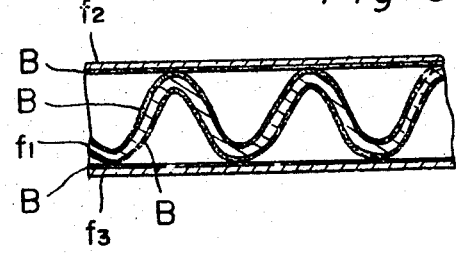
Fig. 3-c

PROCESS FOR MANUFACTURING CORRUGATED THERMOPLASTIC SYNTHETIC RESIN CARDBOARD SHEET

This invention relates to a continuous process for manufacturing with good reproducibility a corrugated thermoplastic synthetic resin cardboard sheet free of defects diminishing the commercial value of the product such as "warp" and "crookedness". More detailedly, this invention relates to a continuous process for manufacturing a corrugated thermoplastic synthetic resin cardboard sheet comprising continuously forwarding a continuous sheet of a thermoplastic synthetic resin through a core sheet shaping zone to thereby shape the running sheet into a core sheet of corrugated cardboard, and melt-press bonding continuously surface liners of a continuous thermoplastic synthetic resin continuous sheet, coincidentally or successively, onto front and back faces of the shaped core sheet, such process being characterized in that thin layers of a thermoplastic synthetic resin having a melting point at least 10°C, lower than that the thermoplastic synthetic resins constituting the core sheet and surface liner sheets are formed on faces selected from the group consisting of i. front and back faces of the continuous thermoplastic synthetic resin sheet to be shaped into the core sheet,
ii. faces of each of the surface liners to be bonded to the core sheet, and
iii. all the faces mentioned in (i) and (ii), before the shaping of the core sheet and before the melt-press bonding of the surface liners onto said continuous core sheet.

In the specification and claims, the term "melting point" means "Vicat softening point" determined by the method according to ASTM D 1525.

Since corrugated cardboard sheets manufactured from paper are poor in water proofing property, corrugated cardboard sheets of water proof paper which has been subjected to a water proof processing to improve the poor water proofing property of the paper have been marketed, but their water proofing property is still insufficient.

Corrugated cardboard sheets manufactured from thermoplastic synthetic resins are as light and tough as those prepared from paper, and they are packing materials very excellent in water proofing property. Accordingly, various proposals have been heretofore made to manufacture corrugated cardboard sheets with use of thermoplastic synthetic resins.

According to such conventional techniques, corrugated cardboard sheets are prepared by continuously forwarding a continuous sheet of a thermoplastic synthetic resin through a core sheet shaping zone to thereby shape the running sheet into a core sheet of corrugated cardboard, and melt-press bonding continuously surface liners of a continuous thermoplastic synthetic resin sheet onto front and back faces of the shaped core sheet. Thus in the conventional methods it is necessary that in the melt-press bonding of a continuous sheet for surface layer onto a continuous sheet for core, both sheets must be in a softened or molten state exhibiting a sufficient stickiness to give a melt-bonding between portions of both sheets to be pressed to each other. Such melt-press bonding method is divided in two groups; the coincidental melt-press bonding method comprising melt-press bonding surface liners onto back and front faces of the continuous core sheet coincidentally and the successive melt-press bonding method comprising melt-press bonding one surface liner onto one of faces of the continuous core sheet and then melt-press bonding another surface liner onto the other face of the continuous core sheet.

In the coincidental method a continuous sheet which has been shaped into a core sheet undergoes a pressure from both front and back faces during the pressing of surface liners thereon while the sheet is in the softened or molten state exhibiting a sufficient stickiness for bonding. Therefore, the configuration of the core sheet is easily deformed by such pressure, which results in decrease of the commercial value of the end product. In an extreme case, the product cannot be utilized as corrugated cardboard. With a view to overcoming this disadvantage, complicated operations and controls have been conducted. For instance, the continuous sheet which has been shaped to have a core configuration is cooled to such a degree that the core configuration may resist the pressure caused by the liner pressing. In this case the cooling is effected in a manner such that the convex top of the core configuration and its vicinity may not be cooled, or the convex top of the core configuration and its vicinity are heated again to give a melt-bondable condition thereto. Accordingly, the coincidental method necessitates such troublesome operations and temperature controls and expensive additional equipment are required for conducting such operations and controls, Further, even if corrugated cardboards are prepared by such disadvantageous method, it is impossible to obtain products of sufficient quality with good reproducibility. Therefore, the preparation of corrugated cardboard sheets is now carried out by the successive method.

According to the successive method, while the continuous core sheet is in the softened state, a liner sheet which is also kept in the softened state is pressed and bonded to one face of the core sheet, and the core sheet having the liner on one face is naturally or positively cooled by a cooling bath or cool air sufficiently to maintain its core configuration while it is forwarded to the next step. Thereafter, another liner sheet kept in the softened state is pressed and bonded to the other face of the continuous core sheet. In this method, the deformation of the core configuration can be avoided to a considerable extent, but the temperature difference between the primarily bonded surface liner and the secondarily bonded surface liner is caused to appear and, therefore, the cooling contraction of the latter liner is greater than that of the former liner, which results inevitably in formation of "warp" and "crookedness".

The formation of "warp" or "crookedness" is disadvantageous in that in the printing on the surface of the resulting corrugated cardboard product a beautiful, uniform printing cannot be obtained and that after-treatments with a rotary slotter or slitter score are made difficult by the presence of "warp" or "crookedness" and therefore, cases or boxes prepared from such corrugated cardboard sheets are extremely low with respect to the commercial value.

In the successive method, as the difference of the contraction between front and back liners is great, the formation of "warp" or "crookedness" is extreme. As is well known in the art of film shaping, in the extrusion of a liner sheet the high take-up rate results in the great orientation in the stretch direction and in decrease of the commercial value of the product caused by a high contraction when the sheet is cooled. For preventing formation of "warp" or "crookedness", the take-up rate in the extrusion of a liner sheet is limited below certain values in the successive melt-press bonding method. Generally, the take-up rate should be maintained below several tens of meters per minute. It is industrially unprofitable to conduct the manufacture of corrugated cardboard sheets at such low rates while using expensive corrugated cardboard shaping machines.

With a view to developing a process for the manufacture of corrugated cardboard sheets by which corrugated cardboard sheets of excellent quality may be prepared with good reproducibility and industrial advantages and by which the above-mentioned defects of both the coincidental and successive melt-press bonding methods may be overcome, we have made conducted research and now found that the abovementioned defects of the conventional techniques can be conveniently overcome by a process in which thin layers of a thermoplastic synthetic resin having a melting point at least 10°C. lower than that of any of thermoplastic synthetic resins constituting the core sheet and surface liner sheets are formed on faces selected from the group consisting of i. front and back faces of the continuous thermoplastic synthetic resin sheet to be shaped into a core sheet,
ii. faces to be bonded to the core sheet, of each of surface liners, and
iii. all the faces mentioned in (i) and (ii), before the shaping of the core sheet and before the melt-press bonding of the surface liners onto the continuous core sheet.

Accordingly, the primary object of this invention is to provide a process which can manufacture continuously corrugated thermoplastic synthetic resin cardboard sheets of excellent quality at high rates and which can overcome the defects and limitations of the conventional methods of preparing corrugated thermoplastic synthetic resin cardboard sheets and can give products free of "warp" and "crookedness".

Other objects and advantages of this invention will be apparent from the description given hereinbelow.

In the process of this invention, thin layers of a thermoplastic synthetic resin (B) having a melting point at least 10°C. lower than that of any of thermoplastic synthetic resins (A) constituting the core sheet and surface liner sheets are formed on the above-mentioned faces (i), (ii) or (iii). In case thin layers are formed on faces of the core sheet, the formation of thin layers is effected before the shaping of the core sheet, namely before the sheet is shaped to have a core configuration. In case thin layers are formed on the surface liner sheets, the formation is effected before the liner sheets are melt-press bonded to the core sheet.

The formation of such thin layers on the above-mentioned faces may be performed by laminating or the like. In this invention it is preferable to use material sheets of resin (A) on which have been formed thin layers of resin (B) in advance. However, the lamination of thin layers may be conducted at any optional point as long as the abovementioned requirement of laminating time is satisfied.

As the thermoplastic synthetic resin (A) constituting the core sheet or the surface liner sheet, vinyl resins such as polyvinyl chloride, polyvinylidene chloride and polystyrene; and polyolefin resins such as low density polyethylene, high density polyethylene, ethylene-propylene copolymer, polypropylene, polybutylene and poly-4-methylpentene-1 may be conveniently used.

As the thermoplastic synthetic resin constituting the thin layer to be formed on the above faces (i), (ii) or (iii) resins may be preferably used selected from the groups consisting of copolymers of ethylene with a saturated monobasic carboxylic acid vinyl ester, copolymers of ethylene with an unsaturated carboxylic acid, copolymers of ethylene with an unsaturated carboxylic acid ester, terpolymers of ethylene with a saturated monocarboxylic acid vinyl ester and an unsaturated carboxylic acid, and partial metal salts of copolymers of ethylene with an unsaturated carboxylic acid. A suitable kind of the thermoplastic synthetic resin (B) is selected depending on the kind of the thermoplastic synthetic resins (A) with the proviso that the melting point of the resin (B) is at least 10°C. lower than that of any of resins (A). A thermoplastic synthetic resin having a melting point of between 50° and 100°C. is preferably used as resin (B).

The thermoplastic synthetic resin (B) will be now detailed.

1. Copolymers of ethylene with a saturated monobasic carboxylic acid vinyl ester:

As the saturated monobasic carboxylic acid vinyl ester, vinyl esters of aliphatic carboxylic acids having 1 to 4 carbon atoms such as vinyl formate, vinyl acetate, vinyl propionate and vinyl butyrate may be used. From the viewpoint of effectiveness and price the use of vinyl acetate is most preferred. A copolymer of ethylene with vinyl acetate containing at least 5 percent by weight of vinyl acetate is particularly preferable. In some cases it is possible to use a partially saponified product of such ethylene-vinyl acetate copolymer.

2. Copolymers of ethylene with an unsaturated carboxylic acid or its ester:

As the unsaturated carboxylic acid acrylic acid, methacrylic acid, maleic acid, fumaric acid may be cited and itaconic acid. As the ester lower alkyl ($C_1 - C_4$) esters such as methyl and ethyl esters are cited. Preferable acids and esters are acrylic acid, methacrylic acid, and methyl and ethyl esters of these acids. Good results are obtainable by the use of copolymers of ethylene with acrylic acid, methacrylic acid or a lower alkyl ($C_1 - C_4$) ester thereof containing at least 5 percent by weight of such acid or ester.

3. Terpolymers of ethylene with a saturated monobasic carboxylic acid vinyl ester and an unsaturated carboxylic acid:

As the saturated monobasic carboxylic acid vinyl ester there vinyl esters of lower aliphatic carboxylic acids having one to four carbon atoms such as vinyl formate, vinyl acetate, vinyl propionate and vinyl butyrate are preferably used. Vinyl acetate is used most advantageously. A preferred content of the vinyl ester in the terpolymer is 5 to 35 percent by weight.

As the unsaturated carboxylic acid monovalent unsaturated carboxylic acids such as acrylic acid and methacrylic acid; and methyl and ethyl monoesters of divalent unsaturated carboxylic acids such as maleic acid, fumaric acid and itaconic acid may be cited. Particularly good results are obtainable by the use of acrylic acid and methacrylic acid. The content of such unsaturated carboxylic acid component in the terpolymer is generally in the range of from 0.01 to 10 percent by weight.

4. Partial metal salts of copolymers of ethylene with an unsaturated carboxylic acid:

There resins are disclosed in the specification of U.S. Pat. No. 3,264,272. More specifically, such resins are prepared by reacting a copolymer of ethylene with an unsaturated carboxylic acid, with at least one water-soluble ionic compound to thereby neutralize more than 10 percent by weight of the carboxylic acid groups of the terpolymer.

Most preferable resins among above-mentioned resins 1 to 4 are copolymers of ethylene with vinyl acetate having a vinyl acetate content of at least 5 percent by weight.

It is preferable to incorporate into such polymers additives such as adhesion reinforcing agents, adhesion assistants, plasticizers and bulking fillers.

In the process of this invention, sheets shaped from the above exemplified resins (A) by inflation method, T-die method, calender method, wet casting method or the like are used as the core and liner sheets. As occasions demand, it is possible to use foamed sheets prepared by employing an inorganic or organic foaming agent.

The thickness of the sheet is not critical in this invention, but a sheet of a thickness of 0.05 to 1.0 millimeter is usually selected as the core or surface liner sheet.

The formation of thin layers of the thermoplastic synthetic resin (B) on faces (i), (ii) or (iii) may be performed by customary laminating methods such as co-extruding method and extrusion-coating method.

For better illustration of this invention, some embodiments of the process of this invention will now be detailed by referring to the appended drawings.

FIG. 3 is a partially enlarged side view showing examples of the corrugated cardboard sheet obtained according to the process of this invention.

Figure 1:
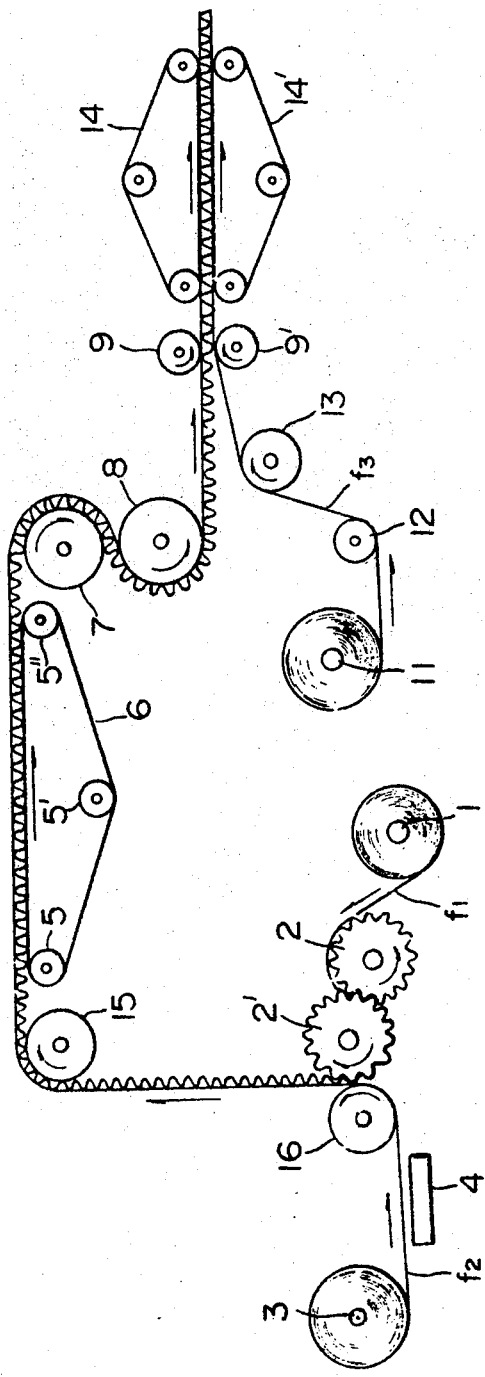
FIG. 1 is a diagrammatic side view showing an embodiment where the process is carried out according to the successive melt-press bonding procedure.

In the successive method of melt-press bonding shown in FIG. 1, a continuous thermoplastic synthetic resin sheet $f_1$ to be shaped into a core sheet is forwarded from a delivery roll 1 and passed through a pair of embossing rolls 2, 2' by which the sheet $f_1$ is shaped to have a core configuration such as wavy, arching or saw-tooth configuration. An optional configuration is given to the sheet according to the shape of embossments formed on the surfaces of embossing rolls. The embossing rolls are heated at a temperature suitable for facilitating the impartion of the core configuration depending on the kind of the resin and the thickness of the sheet $f_1$. If desired, it is possible to provide a heating device in the passage of the sheet $f_1$ between roll 1 and embossing rolls 2, 2' to thereby heat in advance the sheet $f_1$ to a temperature at which the impartion of the core configuration may be effected with ease.

A sheet $f_2$ to be used as one of surface liners is forwarded from a delivery roll 3 and heated by a heating member 4, and is softened and made sticky on the surface to be melted and press-bonded to the core sheet $f_1$ which has been shaped to have a core configuration, to such an extent that adhesion may be attained between the two sheets when they are pressed to each other by press roll 16. Thus sheets $f_1$ and $f_2$ are melted and press-bonded to each other by pressure of embossing roll 2, 2' and press roll 16.

In this case, on the front and back faces of sheet $f_1$, the faces to be bonded to the sheet $f_1$, of the sheet $f_2$ and sheet $f_3$ which will be described below, or all the faces mentioned above there are formed thin layers of a thermoplastic synthetic resin (B) having a melting point at least 10°C. lower than that of any of thermoplastic synthetic resins (A) constituting core sheet $f_1$ and surface liner sheets $f_2$ and $f_3$. In the embodiment shown in FIG. 1 these thin layers are formed on each of the sheets in advance. If desired, it is possible to provide a member for laminating resin (B) on running sheets at a suitable point between delivery roll 1 and embossing rolls 2, 2', or between delivery roll 3 and press roll 16, or between delivery roll 11 and pinch roll 9'. In view of facilitation of the operation and provision of equipment it is particularly advantageous to use sheets on which thin layers of resin (B) have been formed in advance and further, when such sheets are used, corrugated cardboards of particularly excellent quality can be obtained with good reproducibility.

The formation of thin layers of resin (B) on core sheet $f_1$ and surface liner sheets $f_2$ and $f_3$ may be effected by co-extruding methods such as two-layer-inflation method and two-layered T die method. It is also possible to conduct the formation of thin layers of low melting point resin (B) by extrusion coating them on faces of sheets $f_1$, $f_2$ and $f_3$. Still further, thin layers of low melting point resin (B) may be formed by dry lamination according to the above-mentioned conventional methods.

Shaping of the resulting corrugated cardboard sheet can be accomplished more easily as the thickness of the thin layer of resin (B) is thicker.

From the economical viewpoint, however, it is desired to adjust the thickness of the thin layer of resin (B) to 0.01 to 0.10 millimeter.

A single facer composed of integrated core sheet $f_1$ and surface liner sheet $f_2$ is continuously forwarded by a suitable member to a zone where the single facer is melted and press-bonded to another surface liner $f_3$. In the embodiment shown in FIG. 1, the delivery of the single facer is conducted by means of a guide roll 15, a conveyer belt 6 installed around a suitable number of conveyer rolls 5, 5', 5'' disposed at suitable positions and guide rolls 7 and 8. Thus single facer is delivered to pinch rolls 9, 9'.

Another surface liner sheet $f_3$ is forwarded from delivery roll 11 toward pinch rolls 9, 9'. The sheet $f_3$ is heated and softened only on the surface to be melted and press-bonded to the shaped core sheet at a suitable point during the passage from delivery roll 11 to pinch rolls 9, 9' by a heating member (not shown). In the embodiment shown in FIG. 1, the delivery of the sheet $f_3$ from delivery roll 11 to pinch rolls 9, 9' is performed by an air support roll 12 and a guide roll 13.

Between pinch rolls 9, 9' the surface liner sheet $f_3$ is melted and press-bonded to the exposed surface of the core sheet of the single facer. Thus a corrugated cardboard sheet is formed. The product sheet is held between conveyer belts 14, 14' and continuously forwarded to the after-treating step.

As is apparent from the above explanation made by referring to one embodiment according to the successive melt-press bonding procedure, in the process of this invention at the melt-press bonding it is unnecessary to heat and soften core sheet $f_1$ or surface liner sheets $f_2$ and $f_3$ per se so as to make them sticky and melt-bondable, with the result that it is possible to maintain the thermal history of each sheet at an equivalent level. Accordingly, formation of "warp" or "crookedness" caused by difference of contraction in these sheets, which is inevitable in the conventional successive method of melt-press bonding, can be prevented and products of high commercial value can be prepared continuously with good reproducibility. Further, the above-mentioned limitation imposed on the take-up rate of the surface liner sheet in the conventional successive method can be excepted in the process of this invention. Namely, while in the conventional successive method the take-up rate of surface liner film is about 20 m/min at most, in the process of this invention the shaping can be carried out at a rate as high as 100 m/min. Furthermore, even when these material sheets, particularly core sheet $f_1$, are cooled to low temperatures so as to fix the shaped configuration firmly and sufficiently, it is enough that only thin layers of resin (B) are softened by heating to such an extent that only thin layers may exhibit a stickiness at the melt-press bonding. In addition, the melt-ing point of resin (B) is at least 10°C. lower than any of resins (A). Accordingly, there is no danger of deformation of the shaped configuration by pressure of pinch rolls 9, 9' at all.

Figure 2:
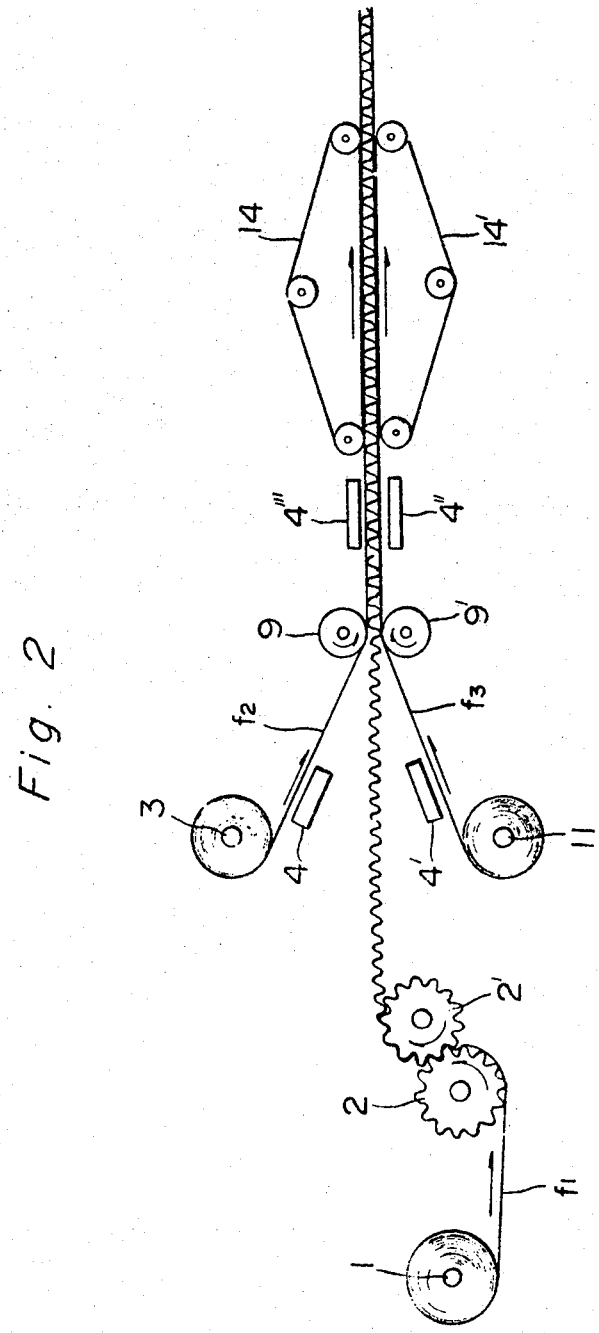
FIG. 2 is a similar side view showing another embodiment where the process is conducted according to the coincidental melt-press bonding procedure.

FIG. 2 is a diagrammatic side view similar to FIG. 1, illustrating an embodiment of the process of this invention according to the coincidental melt-press bonding procedure.

In FIG. 2, a sheet $f_1$ to form a core is forwarded from a delivery roll 1 and shaped to have a desired core configuration between embossing rolls 2, 2' in the same manner as explained with respect to FIG. 1. The so shaped core sheet is continuously forwarded toward pinch rolls 9, 9'. The delivery of the core sheet may be performed by means of similar suitable guide rolls and conveyer belt to those shown in FIG. 1, though these means are not shown in FIG. 2. Further, as in the embodiment shown in FIG. 1, the shaped core sheet may be naturally or positively cooled during the passage to pinch rolls to fix the core configuration sufficiently.

Two sheets $f_2$ and $f_3$ for surface liners are forwarded from delivery rolls 3 and 11, respectively, and passed to pinch rolls 9, 9'. During this passage the sheets $f_2$ and $f_3$ may be heated on the surfaces to be melted and press-bonded to the core sheet. In the Figure heating means 4, 4' are shown. It is possible to provide another heating means for heating the core sheet or to provide, instead of heating means 4, 4', a duplex heating electric heater for heating both the core sheet and the surface liner sheets.

Between pinch rolls 9, 9' the surface liner sheets $f_2$ and $f_3$ are coincidentally melted and press-bonded to the surfaces of the shaped core sheet $f_1$. As is explained with respect to FIG. 1, since thin layers of low melting point resin (B) are formed on the faces (i), (ii) or (iii), in the process of this invention it is unnecessary to heat these sheets to such an extent that these sheets per se exhibit stickiness. Consequently, deformation of the core configuration is not caused to occur in the core sheet and for the reasons described with respect to the embodiment of FIG. 1 occurrence of phenomenon of "warp" or "crookedness" which will decrease the commercial value of the product, can be prevented perfectly and since the process is carried out according to the coincidental procedure, the prevention of formation of such defects is more complete and products of more excellent quality can be obtained with good reproducibility.

In the embodiment shown in FIG. 2, preheaters 4'', 4''' are provided at the point before the resulting corrugated cardboard sheet is forwarded by delivery conveyer belts 14, 14'. These preheaters are provided for dispersing and relaxing the stress which has been caused when the core configuration was imparted to the core sheet and which remains in the core sheet. Of course, these preheaters may be omitted.

Arrows in FIGS. 1 and 2 show the directions of movements of sheets and rotations of rolls and conveyer belts.

Thus, in accordance with the process of this invention it is possible to manufacture continuously corrugated cardboard sheets of excellent quality at improved manufacturing rates without any danger of formation of "warp" or "crookedness" which will decrease the commercial value of the product. Although FIGS. 1 and 2 illustrate embodiments where core sheets and surface liner sheets are forwarded after they have been once wound onto delivery rolls, it is also possible to combine the sheet preparation step directly with the corrugated cardboard preparation step and conduct both the steps continuously.

In FIG. 3a, FIG. 3b and FIG. 3c there are given partially enlarged side views of some examples of corrugated cardboard sheets manufactured according to the process of this invention. FIG. 3a illustrates an example where thin layers of low melting point thermoplastic synthetic resin (B) are formed on the faces bonded to the core sheet $f_1$, of both surface liner sheets $f_2$ and $f_3$. FIG. 3b illustrates an example where thin layers of low melting point resin (B) are formed on both the front and back faces of the core sheet $f_1$. FIG. 3c illustrates an example where thin layers of low melting point resin (B) are formed on the faces of the core sheet $f_1$ and the faces bonded to the core sheet $f_1$, of surface liner sheets $f_2$ and $f_3$.

Typical working examples of the process of this invention will now be described below with reference to either the successive melt-press bonding procedure or coincidental melt-press bonding procedure. "Parts" and "percentages" in examples are based on the weight unless otherwise indicated.

Example 1

A sheet $f_1$ to be formed in a core to be used in this Example is a sheet of 0.3 mm thickness shaped from a dry blend resin of 8 parts of low density polyethylene and 2 parts of ordinary polystyrene. Each of surface liner sheets $f_2$ and $f_3$ is prepared by extrusion coating a 0.02 mm thick lamination of a copolymer of ethylene and vinyl acetate on one surface of a 0.4 mm substrate composed of a foamed sheet obtained by foaming at a foaming ratio of 1.8 a mixture of a dry blend resin of 7 parts of high density polyethylene and 3 parts of low-density polyethylene and 0.05 part of a azodicarbonamide (foaming agent). The melting point of the above ethylenevinyl acetate copolymer is 64°C. The melting point of the dry blend resin constituting the core sheet is 90°C., and that of the dry blend resin constituting the surface liner sheet is 89°C.

The Example is carried out according to the embodiment shown in FIG. 1.

The above-mentioned core sheet $f_1$ is forwarded from a delivery roll 1 and passed through embossing rolls 2,2' heated at 95°C., to impart a core configuration to the sheet $f_1$. One surface liner sheet $f_2$ is forwarded from a delivery roll 3 and its laminate layer of the copolymer of ethylenevinyl acetate is heated by a preheater 4. Then, the shaped core sheet $f_1$ and the surface liner sheet $f_2$ are melted and press-bonded to each other by a press roll 16. At the melt-press bonding, the temperature of the ethylene-vinyl acetate copolymer was 70°C., and temperature of the substratum of the sheet $f_2$ is 50°C. The single facer, on one of whose surfaces the surface liner sheet has been bonded is allowed to pass a guide roll 15 and a conveyer roll 6, and then moves through guide rolls 7 and 8 at a rate of 60 m/min. Another surface liner sheet $f_3$ similar to the sheet $f_2$ is forwarded from a delivery roll 11, and the laminate layer of the sheet $f_3$ is heated at 70°C. and the substratum thereof is heated at 50°C., while being supported by an air support roll 12 then, the sheet $f_3$ is forwarded through a guide roll 13 toward pinch rolls 9,9'. Between pinch rolls 9, 9' the surface liner sheet $f_3$ forwarded from the delivery roll 11 is melted and press-bonded to the single facer forwarded from the guide roll 8.

The so formed corrugated cardboard sheet material is forwarded to the after-treatment step by means of conveyers 14, 14'.

Physical properties of the so prepared corrugated cardboard sheet are shown in Table 1 below.

For comparison, a corrugated cardboard sheet is prepared in the same manner as above, except that thin laminate layers of a low melting point resin are not formed on any of the faces of the core sheet $f_1$ and surface liner sheets $f_2$ and $f_3$ and that heating means are provided just before pinch rolls 9, 9' to heat the sheets to such an extent that they are sticky and bondable to each other (Comparative Example 1). Physical properties of the comparative product are also shown in Table 1.

Table 1

| | Product of Example 1 | Product of Comparative Example 1 |
|---|---|---|
| Peel strength (kg/in) | 0.39 | 0.42 |
| Crush strength (kg/cm) | 7.09 | 7.25 |
| Ratio of formation of "warp" (%) | 8 | 37 |

Values of peel strength, crush strength and ratio of formation of "warp" are determined and evaluated by the following test methods.

1. Peel strength

The testing is effected in the light of "the test for T-peel for adhesive" according to ASTM D 1876-69.

Figure 4:
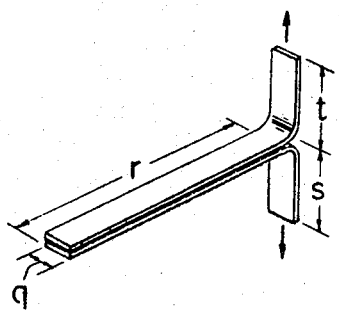

Five sheets of test pieces shown in FIG. 4 as shown in the testing publication are prepared. Both ends of each test piece are stretched to the direction shown by the arrow in the drawing at a constant rate of 15 mm/min by means of a tensile tester, and the maximum load which appears while the piece is completely peeled, is read. The mean values of reading of the load of five test pieces is defined as peel strength. The stretching direction is vertical to the bonding line direction. Other conditions such as humidity and room temperature are based on ASTM D 1876-69. (In the drawing, $q = 1$ inch, $r = 9$ inches, $s = 3$ feet and $t = 3$ inches.)

2. Crush strength

The testing is effected in the light of "the standard method of test for ring crush of paper board" according to ASTM D 1164-60.

Figure 5:
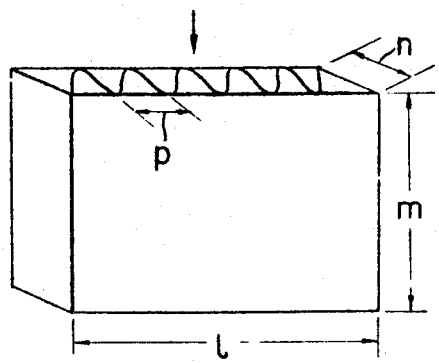

Five sheets of test pieces shown in FIG. 5 are prepared and each test piece is compressed at a rate of 15 mm/min in the same direction as the direction of the bonding line. The maximum value of the load, which appears while the test piece is completely crushed, is read, and the load is divided by the pressure-receiving length ($l$ in the drawing). A means of the so obtained values of five test pieces is defined as crush strength. (In the drawing, $l = 100$ mm, $m = 50$ mm, $m = 5$ mm and $p = 8$ mm.)

3. Ratio of formation of "warp"

Five pieces shown in FIG. 5 as shown in the testing publication are cut from optional portions of the resulting corrugated cardboard sheet and fixed on the surface of a wooden plate by means of an adhesive. A hard rubber roll on which a printing ink has been thinly applied is pressed on the test pieces in the direction of the bonding line to transfer the ink of the roll onto the surfaces of the test pieces.

With respect to each test piece, the value A is calculated by the following formula:

A = (Surface area of the test piece on which the ink is not applied/Whole surface area of the test piece) × 100

A mean of values A of the five test pieces is defined as ratio of formation of "warp" of the tested corrugated cardboard sheet.

Example 2

A sheet $f_1$ for core to be used in this Example is a 0.3 mm thick sheet prepared by shaping a blend resin composed of 6 parts of polyvinyl chloride and 4 parts of ordinary polystyrene. Each of surface liner sheets $f_2$ and $f_3$ is a two-layer inflation film composed of a substratum sheet of high density polyethylene and a laminate sheet of a terpolymer of ethylene with 28 percent of vinyl acetate and 1 percent of ethyl methacrylate. The thickness of the substratum sheet is 0.2 mm and that of the laminate sheet is 0.02 mm. The melting point of the blend resin of the core sheet $f_1$ is 83°C. and that of the resin constituting the substrata of two sheets $f_2, f_3$ is 95°C. The laminate sheet terpolymer melts at 66°C.

This Example is conducted according to the embodiment shown in FIG. 2.

The sheet $f_1$ for core is forwarded from a delivery roll 1 and shaped to have a core configuration by means of embossing rolls 2, 2' heated at 105°C. Then, the sheet $f_1$ is moved toward a pair of pinch rolls 9, 9'. Surface liner sheets $f_2$ and $f_3$ forwarded from delivery rolls 3 and 11, respectively, are heated on the surface of the laminate layer which has low melting point by heaters 4, 4' and then forwarded toward pinch rolls 9, 9'. The temperatures of the core sheet $f_1$, the substratum of each of the surface liner sheets $f_2$ and $f_3$ and the low melting point resin laminate of each of the surface liner sheets $f_2$ and $f_3$ are 55°C., 53°C., and 70°C., respectively, when they pass through pinch rolls 9, 9'. Thus, the sheets $f_1$, $f_2$ and $f_3$ are melted and press-bonded between pinch rolls 9, 9' and the resulting corrugated cardboard sheet material is forwarded at a rate of 80 m/min via two afterheaters 4", 4''' to the after-treatment step by means of conveyers 14, 14'.

Properties of the so formed corrugated cardboard sheet are shown in Table 2 below.

Table 2

| | |
|---|---|
| Peel strength (kg/in) | 0.41 |
| Crush strength (kg/cm) | 6.83 |
| Ratio of formation of "warp" (%) | 9.2 |

Example 3 to 12

According to the manner described in Example 1 or 2, various corrugated cardboard sheets are prepared by varying the kinds of resins of sheets and thin layers as shown in Table 3 below. Physical properties of these corrugated cardboard sheets are also shown in Table 3.

Notes:
  LDPE; low density polyethylene
  HDPE; high density polyethylene
  PVC; polyvinyl chloride
  CC; calcium carbonate
  ADCA; azodicarbonamide
  VA; vinyl acetate
  AA; acrylic acid
  FA; fumaric acid
  VP; vinyl propionate
  MA; methacrylic acid
  PS; polystyrene Comparative Example 2

For the purpose of comparing a product obtained by melt-press bonding thin layers of a low melting point thermoplastic resin (B) with a product obtained by the wet coat bonding method, a corrugated cardboard sheet is prepared by using the same core sheet and surface liner sheets as employed in Example 1, bonding these sheets by means of a toluene solution containing 50 percent of a copolymer of ethylene with vinyl acetate (vinyl acetate content in the copolymer being 20 percent) and evaporating the solvent toluene. Physical properties of the resulting corrugated cardboard sheet are tested in the same manner as in Example 1 by using five test pieces. Results are shown in Table 4 below.

TABLE 3

| Example number | Resin of core sheet $f_1$ | | | Resin of surface liner sheets $f_2, f_3$ | | | Resin of thin layer | | | Physical properties of resulting cardboard sheets | | |
|---|---|---|---|---|---|---|---|---|---|---|---|---|
| | Kind of resin | Thickness (mm.) | Melting point (°C.) | Kind of resin | Thickness (mm.) | Melting point (°C.) | Kind of resin | Thickness (mm.) | Melting point (°C.) | Melt-press bonding procedure | Peel strength (kg/in.) | Crush strength (kg/cm.) | Ratio of formation of "warp" (percent) |
| 3 | Blend of 3 parts of LDPE and 7 parts of HDPE. | 0.3 | 89 | LDPE | 0.4 | 85 | Copolymer of 95 parts of ethylene and 5 parts of VA. | 0.02 | 64 | Same as in Example 1. | 0.40 | 7.23 | 9.0 |
| 4 | do | 0.3 | 89 | LDPE | 0.4 | 85 | Copolymer of 95 parts of ethylene and 5 parts of AA. | 0.02 | 70 | Same as in Example 1. | 0.36 | 7.01 | 9.2 |
| 5 | do | 0.3 | 89 | LDPE | 0.4 | 85 | do | 0.02 | 68 | Same as in Example 2. | 0.37 | 7.11 | 8.1 |
| 6 | do | 0.3 | 89 | LDPE | 0.4 | 85 | Terpolymer of 93 parts of ethylene, 6 parts of VA and 1 part of AA. | 0.02 | 73 | do | 0.35 | 7.05 | 8.09 |
| 7 | Blend of 8 parts of LDPE and 2 parts of ordinary PS. | 0.3 | 90 | Blend of 7 parts of HDPE, 3 parts of LDPE and 0.03 parts of ADCA. | 0.4 | 89 | Partial sodium salt of copolymer of 94 parts of ethylene and 6 parts of AA. | 0.02 | 65 | Same as in Example 1. | 0.39 | 6.97 | 8.2 |
| 8 | Blend of 6 parts of PVC and 4 parts of ordinary PS. | 0.3 | 83 | HDPE | 0.2 | 95 | Copolymer of 80 parts of ethylene and 20 parts of VA. | 0.02 | 68 | Same as in Example 2. | 0.37 | 6.75 | 8.9 |
| 9 | Polypropylene | 0.3 | 105 | Blend of 7 parts of HDPE and 3 parts of LDPE. | 0.4 | 89 | Terpolymer of 83 parts of ethylene, 6 parts of VA and 1 part of FA. | 0.02 | 67 | Same as in Example 1. | 0.35 | 7.15 | 6.5 |
| 10 | Blend of 7 parts of HDPE and 3 parts of LDPE. | 0.6 | 89 | HDPE | 0.7 | 95 | Copolymer of 95 parts of ethylene and 5 parts of VP. | 0.06 | 71 | Same as in Example 2. | 0.39 | 9.83 | 5.0 |
| 11 | Blend of 5 parts of HDPE, 3 parts of LDPE, and 2 parts of CC. | 0.8 | 86 | LDPE | 0.9 | 85 | Copolymer of 85 parts of ethylene and 5 parts of MA. | 0.1 | 70 | do | 0.41 | 10.80 | 4.0 |
| 12 | Polypropylene | 0.08 | 105 | LDPE | 0.1 | 85 | Partial magnesium salt of copolymer of 94 parts of ethylene and 6 parts of MA. | 0.02 | 75 | Same as in Example 1. | 0.35 | 3.15 | 13.5 |

Table 4

| | |
|---|---|
| Peel strength (kg/in) | 0.12 |
| Crush strength (kg.cm) | 4.25 |
| Ratio of formation of "warp" (%) | 5.5 |

What we claim is:

1. A continuous process for the production of a corrugated fiber-free thermoplastic synthetic resin sheet which consists essentially of continuously forwarding a continuous sheet of a thermoplastic synthetic resin (A) selected from the group consisting of polyvinyl chloride, polyvinylidene chloride, polystyrene, low density polyethylene, high density polyethylene, ethylene-propylene copolymer, polypropylene, polybutylene and poly-4-methylpentene-1, front and back surfaces of which are coated with thin layers of a copolymer (B) of ethylene and vinyl acetate containing at least 5 percent vinyl acetate, said copolymer (B) having a melting point at least 10°C. lower than thermoplastic resin (A), to a core sheet shaping zone to shape said sheet of thermoplastic resin (A) into a corrugated core sheet; forwarding said corrugated core sheet to a pre-heating zone to soften said thin layers of copolymer (B) coated on the front and back surfaces of said corrugated core sheet; forwarding said corrugated core sheet from said pre-heating zone to a melt-press bonding zone; simultaneously forwarding surface liners of a continuous thermoplastic resin (A) selected from the group consisting of polyvinyl chloride, polyvinylidene chloride, polystyrene, low density polyethylene, high density polyethylene, ethylene-propylene copolymer, polypropylene, polybutylene and poly-4-methylpentene-1 to said melt-press bonding zone in a manner so that said surface liners are melt-press bonded to opposite surfaces of said corrugated core sheet; and withdrawing said fiber-free corrugated thermoplastic synthetic resin sheet from said melt-press bonding zone.

2. The process of claim 1 wherein said corrugated core sheet and surface liner sheets have a thickness of from 0.05 to 1.0 millimeter.

3. The process of claim 1 wherein the thickness of the thin layer of copolymer (B) is within a range of from 0.01 to 0.1 millimeter.

4. A continuous process for the production of a corrugated fiber-free thermoplastic synthetic resin sheet which consists essentially of continuously forwarding a continuous sheet of a thermoplastic synthetic resin (A) selected from the group consisting of polyvinyl chloride, polyvinylidene chloride, polystyrene, low density polyethylene, high density polyethylene, ethylene-propylene copolymer, polypropylene, polybutylene and poly-4-methylpentene-1 to a core sheet shaping zone to shape said sheet of thermoplastic resin (A) into a corrugated core sheet; continuously forwarding surface liner sheets of a thermoplastic resin (A) selected from the group consisting of polyvinyl chloride, polyvinylidene chloride, polystyrene, low density polyethylene, high density polyethylene, ethylene-propylene copolymer, polypropylene, polybutylene and poly-4-methylpentene-1, one surface of each sheet being coated with a thin layer of a copolymer (B) of ethylene and vinyl acetate containing at least 5 percent vinyl acetate, said copolymer (B) having a melting point at least 10°C. lower than thermoplastic resin (A) to a pre-heating zone to soften said thin layers of copolymer (B); simultaneously forwarding said corrugated core sheet and said surface liners to a melt-press bonding zone in a manner so that said surface liners are melt-press bonded to said core sheet with the softened thin layers of copolymer (B) in contact with said corrugated core sheet; and withdrawing said fiber-free corrugated thermoplastic synthetic resin sheet from said melt-press bonding zone.

5. The process of claim 4 wherein said corrugated core sheet and surface liner sheets have a thickness of from 0.05 to 1.0 millimeter.

6. The process of claim 4 wherein the thickness of the thin layer of copolymer (B) is within a range of from 0.01 to 0.1 millimeter.

* * * * *